US008060005B2

(12) United States Patent
Serbanescu

(10) Patent No.: US 8,060,005 B2
(45) Date of Patent: Nov. 15, 2011

(54) METHOD AND DEVICE FOR PROVIDING ACTIVE SECURITY TO A CONTACT-FREE ELECTRONIC DEVICE

(75) Inventor: Dan Serbanescu, Noisy le Sec (FR)

(73) Assignee: Oberthur Technologies, Levallois-Perret (FR)

( * ) Notice: Subject to any disclaimer, the term of this patent is extended or adjusted under 35 U.S.C. 154(b) by 745 days.

(21) Appl. No.: 11/994,849

(22) PCT Filed: Jul. 12, 2006

(86) PCT No.: PCT/FR2006/001700
§ 371 (c)(1),
(2), (4) Date: Jan. 7, 2008

(87) PCT Pub. No.: WO2007/010117
PCT Pub. Date: Jan. 25, 2007

(65) Prior Publication Data
US 2008/0166962 A1    Jul. 10, 2008

(30) Foreign Application Priority Data

Jul. 18, 2005   (FR) ...................................... 05 07610

(51) Int. Cl.
*H04K 3/00* (2006.01)
*H04B 5/00* (2006.01)
(52) U.S. Cl. ......................................... 455/1; 340/572.1
(58) Field of Classification Search ............. 455/1, 41.1, 455/410, 411; 340/10, 572.1, 10.1
See application file for complete search history.

(56) References Cited

U.S. PATENT DOCUMENTS

| | | | |
|---|---|---|---|
| 5,841,123 | A | 11/1998 | Thorigne et al. |
| 6,108,636 | A | 8/2000 | Yap et al. |
| 6,111,506 | A | 8/2000 | Yap et al. |
| 6,588,660 | B1 | 7/2003 | Buescher et al. |
| 7,221,900 | B2 * | 5/2007 | Reade et al. ...................... 455/1 |
| 2004/0133585 | A1 | 7/2004 | Pautot | |

FOREIGN PATENT DOCUMENTS

| | | |
|---|---|---|
| DE | 29714999 | 10/1997 |
| EP | 0750276 | 12/1996 |
| EP | 1091312 | 4/2001 |
| JP | 1145316 | 6/1989 |
| JP | 10255009 | 9/1998 |
| JP | 2001/067524 | 3/2001 |
| JP | 2004/188215 | 7/2004 |
| JP | 2007/172310 | 7/2007 |
| WO | 97/38395 | 10/1997 |
| WO | 01/52204 A1 | 7/2001 |
| WO | 02/09030 A1 | 1/2002 |
| WO | 2005/045754 A1 | 5/2005 |
| WO | 2005/052846 | 6/2005 |

* cited by examiner

*Primary Examiner* — Lee Nguyen
(74) *Attorney, Agent, or Firm* — Young & Thompson

(57) ABSTRACT

The invention concerns a scrambling electronic device adapted to be magnetically coupled with an inductive element (L3) of a contact-free external communication station (LEC). The scrambling device comprises active scrambling means (DB) adapted, in response to the magnetic field radiated by the external communication station (LEC), to generate a charge modulation capable of causing a collision with the charge modulation generated by the contact-free electronic device (CSC) when the latter is arranged relative to said scrambling electronic device in accordance with a selected relationship, said resulting collision disabling data exchange between the contact-free external communication station (LEC) and the contact-free electronic device (CSC).

20 Claims, 2 Drawing Sheets

METHOD AND DEVICE FOR PROVIDING ACTIVE SECURITY TO A CONTACT-FREE ELECTRONIC DEVICE

BACKGROUND OF THE INVENTION

Field of the Invention

The present invention concerns the active security of the operation of a contact-free electronic device adapted in particular to the contact-free communication technology as described in the ISO 14443 standard.

It also concerns an electronic entity including a contact-free electronic device to be integrated into a support, such as a passport, driver's license or, more generally, an identity document that a bearer may be required to show during identity checks.

It also concerns a document consisting of two parts each formed by a card conforming to the ISO 7816 standard and flexibly connected to each other by one of their sides.

It also finds an application in the context of a document containing at least one contact-free card.

It relates further to a method for preventing fraudulent communication (writing and/or reading) between an external contact-free communication station and a contact-free electronic device.

It finds applications both in the contact-free communication technology and in the dual or hybrid technology, in which the contact-free electronic device further includes a contact communication interface.

Description of the Related Art

It has already been proposed to integrate into a security document, in practice carrying printed data intended to enable an identity check, a contact-free electronic device, for example a microprocessor integrated circuit adapted to communicate with the external environment by means of an antenna, to enable an exchange of information without contact between that document and an external contact-free communication station. The exchange of data is typically effected at the initiative of the communication station (the station sends commands to which the contact-free electronic device responds).

This kind of security document enables the exchange of data richer in information than printed characters, or even a photo, such as biometric data, and, where applicable, verification of the compatibility between the printed data and the stored data, so as to detect any attempt to corrupt the printed data.

However, this principle of contact-free reading of the data contained in the integrated circuit comes up against the understandable fear that the data could be read unknown to the bearer, by systems that could be unauthorized.

Contact-free cards generally function through magnetic coupling (ISO 14443 or other standards) and are not invulnerable to fraudulent intrusion action, known as skimming.

It is therefore desirable to prevent by physical action the activation of the card and free communication with a station. Communication with an external station must take place only with the knowledge of the bearer and through intentional action of the bearer. It is therefore necessary to implement antiskimming countermeasures to prevent fraudulent reading of the content of the card.

This kind of countermeasure is useful in the field of passports with identification data and biometric data readable by contact-free magnetic procedures.

This kind of countermeasure to protect against remote intrusion is also desirable in the context of contact-free cards which, placed in a wallet, for example, must not be readable remotely and must communicate only when they are taken out by their bearer in order to be read.

A number of technologies that offer a certain level of physical protection by passive means are already known.

A first technology provides total shielding of the Faraday cage type. Using this technology, the contact-free document or card is kept in a conductive case forming a Faraday cage that prevents any communication between the card and the station. To authorize communication, the bearer must extract the document from its case and offer it up to the station. The procedure is effective, but the combination is relatively bulky, liable to wear and constraining to use.

A second technology modifies the portion of the magnetic coupling by adding to it mobile metallic elements that disturb strongly the field from the station by magnetic shielding and by mistuning the oscillatory circuit. This second technology is described in particular in the documents WO 2005/045754, U.S. Pat. No. 6,111,506 and U.S. Pat. No. 6,108,636. In practice, to enable communication, the bearer moves the contact-free card away from the shield or the disturbing winding, for example by opening the passport.

However, if the station is more powerful or the document is not completely closed, the countermeasure is insufficient because it is impossible to ensure sufficient screening to render communication between the contact-free card and the station inoperative.

A third technology produces a controlled mistune of the oscillatory circuit of the contact-free card. This third technology, described in particular in U.S. Pat. No. 6,586,660, uses a contact-free card in which the antenna oscillator circuit is mistuned to a frequency higher than that of the station. For example, by offering the antenna of the contact-free card up to the station with the thumb intentionally placed on a precise place, the oscillator circuit is retuned and communication with the station is made possible.

This method requires reduction of the ISO format of the card and its efficacy is determined by the position and the size of the finger.

Moreover, the necessity to hold the card in the fingers in a precise place is constraining and inconvenient.

SUMMARY OF THE INVENTION

The present invention provides a solution to these various problems.

It relates to a jammer electronic device adapted to be magnetically coupled with an inductive component of an external contact-free communication station.

According to a general definition of the invention, the jammer electronic device comprises active jamming means adapted, in response to the magnetic field radiated by the external communication station, to generate a load modulation liable to cause a collision with the load modulation generated by a contact-free electronic device when the latter is disposed relative to said jammer electronic device in accordance with a chosen relation, said collision caused in this way rendering inoperative the exchange of information between the external contact-free communication station and the contact-free electronic device.

Generally speaking, reception by an external contact-free communication station conforming to the ISO 14443 standard is affected by the simultaneous presence of a plurality of contact-free electronic devices in the radius of activity of the external station.

The standard provides an anticollision procedure for remedying interference between simultaneous transmissions from two or more contact-free electronic devices that are offered up to the external contact-free communication station. If the relative positions and distances of the contact-free electronic devices enable each contact-free electronic device to be powered up, each of them is ready to send to the common external contact-free communication station.

Without the intervention of the anticollision protocol, the contact-free electronic devices can transmit simultaneously, causing unacceptable interference on reception.

This interference can totally prevent communication if the two (or more) signals received by the station have relatively close levels, as the error rate introduced is high. To choose the contact-free electronic device that is the closest, it is necessary for the differences in level to be relatively large for error-free operation.

The anticollision protocol "gives the floor" turn and turn about to each contact-free electronic device powered in this way. In practice, the protocol is hardwired (implemented in hardware) in each contact-free electronic device conforming to the ISO 14443 standard.

The present invention exploits in a surprising and advantageous way the effect of collisions between transmissions to the external contact-free communication station.

In practice, the relationship between the jammer electronic device and the contact-free electronic device is chosen so that if the jammer electronic device is in the immediate vicinity of the contact-free electronic device, said jammer electronic device renders inoperative the communication between the external contact-free communication station and the contact-free electronic device, whereas if the jammer electronic device is far away from the contactless electronic device, communication between the external communication station and the contact-free electronic device is rendered operative.

According to one feature, the load modulation rate generated by the jammer electronic device is higher than the load modulation rate generated by the contact-free electronic device.

For example, the load modulation rate generated by the jammer electronic device is of the order of at least 70%.

According to one embodiment, the load modulation generated by the jammer electronic device in response to the magnetic field radiated by the external contact-free communication station is permanent.

According to one embodiment, the jamming means comprise:
  an LC type tuned oscillatory circuit adapted to pick up by magnetic coupling an alternating voltage in the presence of the magnetic field created by the inductive component of the external contact-free communication station;
  rectifier means for transforming the alternating voltage captured in this way into a DC supply voltage; and
  an oscillator circuit adapted, if said DC power supply voltage generated in this way exceeds a chosen threshold, to apply an alternating signal to the terminals of amplitude modulation means adapted to modulate the amplitude of said alternating signals at the terminals of the oscillatory circuit.

In practice, the oscillatory circuit comprises an antenna forming a loop tuned with a tuning capacitor and coupled to the inductive component of the external contact-free communication station to generate at the terminals of the antenna an induced alternating supply voltage in the presence of the magnetic field created by the inductive component of the station.

In another embodiment, the oscillator circuit is of the RC type and delivers an alternating signal at a chosen oscillation frequency.

For their part, the modulation means comprise switching means clocked at said oscillation frequency.

For example, the switching means comprise a CMOS transistor.

The present invention further consists in an electronic entity of the document or like type, including a support having at least first and second portions adapted to move one relative to the other and a contact-free electronic device mounted in the first portion of the support and including an electronic microcircuit and an antenna electrically connected to said electronic microcircuit and adapted to be coupled magnetically with an external contact-free communication station.

According to another aspect of the invention, the second portion of the entity has a jammer electronic device comprising active jamming means adapted, in response to the magnetic field radiated by the external communication station, to generate a load modulation liable to cause a collision with the load modulation generated by the contact-free electronic device when it is placed in a chosen relationship relative to said jammer electronic device, said collision caused in this way rendering inoperative the exchange of information between the external contactless communication station and the contact-free electronic device.

According to one embodiment, the first and second portions can be moved along a chosen displacement line.

For example, the document can be folded.

In practice, the document belongs to a group formed by security documents, identity documents, passports, driver's licenses.

The present invention further consists in a method for providing active security to a contact-free electronic device.

Another aspect of the invention provides for the use of a jammer electronic device adapted, in response to the magnetic field radiated by an external communication station, to generate a load modulation liable to cause a collision with the load modulation generated by the contact-free electronic device when the latter is disposed relative to said jammer electronic device in a chosen relationship, said collision caused in this way rendering inoperative the exchange of information between the external contact-free communication station and the contact-free electronic device.

The present invention finally consists in a method making secure the exchange of information between a contact-free electronic device and an external contact-free communication station, said contact-free electronic device including an electronic microcircuit and an antenna electrically connected to said electronic microcircuit and adapted to be magnetically coupled with the external contact-free communication station.

According to a further aspect of the invention, provision is made for using a jammer electronic device comprising active jamming means adapted, in response to the magnetic field radiated by the external communication station, to generate a load modulation liable to cause a collision with the load modulation generated by the contact-free electronic device when the latter is disposed in a chosen relationship relative to said jammer electronic device, said collision caused in this way rendering inoperative the exchange of information between the external contact-free communication station and the contact-free electronic device.

BRIEF DESCRIPTION OF THE DRAWING FIGURES

Other features and advantages of the invention will become apparent in the light of the following detailed description and the drawings, in which.

Figure 2:
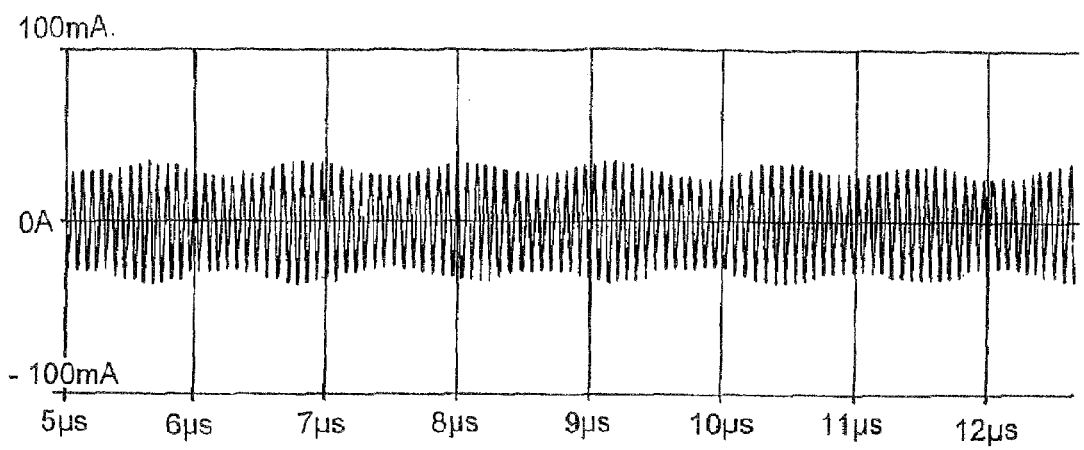
FIG. 2 is a timing diagram showing the current in the loop of a contact-free electronic device conforming to the ISO 14443 standard for a given coupling with an external communication station.
Figure 3:
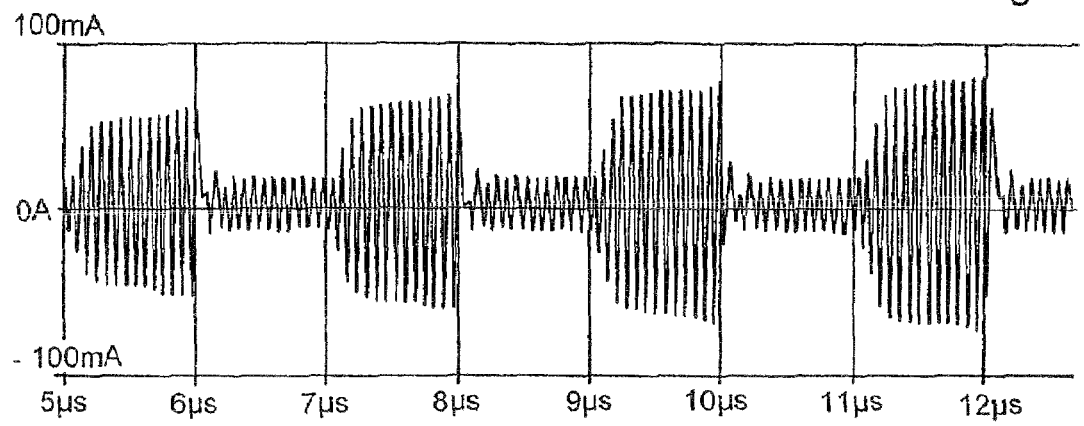
Figure 4:
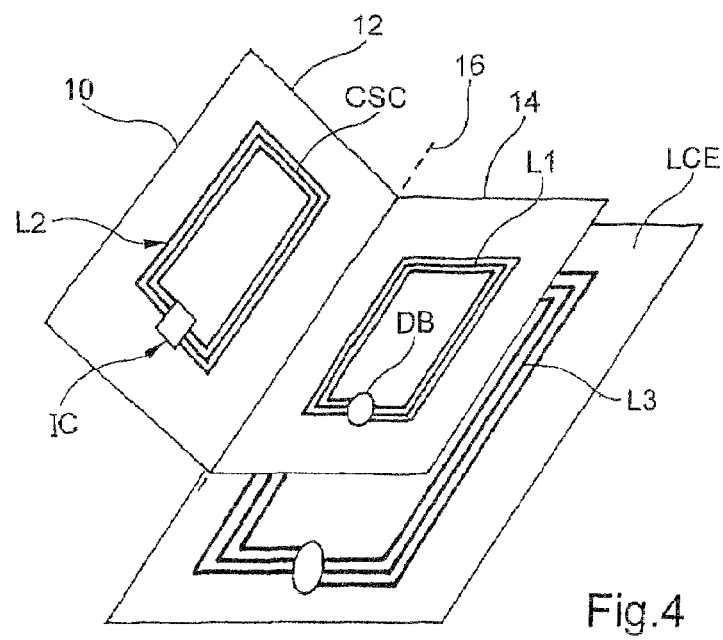

FIG. 3 is a timing diagram showing the current in the loop of the jammer electronic device according to the invention for coupling identical to FIG. 2 with the external communication station; and FIG. 4 is a diagram showing a security document equipped with the jammer electronic device of the invention and a contact-free electronic device, said document being open and close-coupled to the inductive component of an external contact-free communication station.

DETAILED DESCRIPTION OF THE INVENTION

Figure 1:
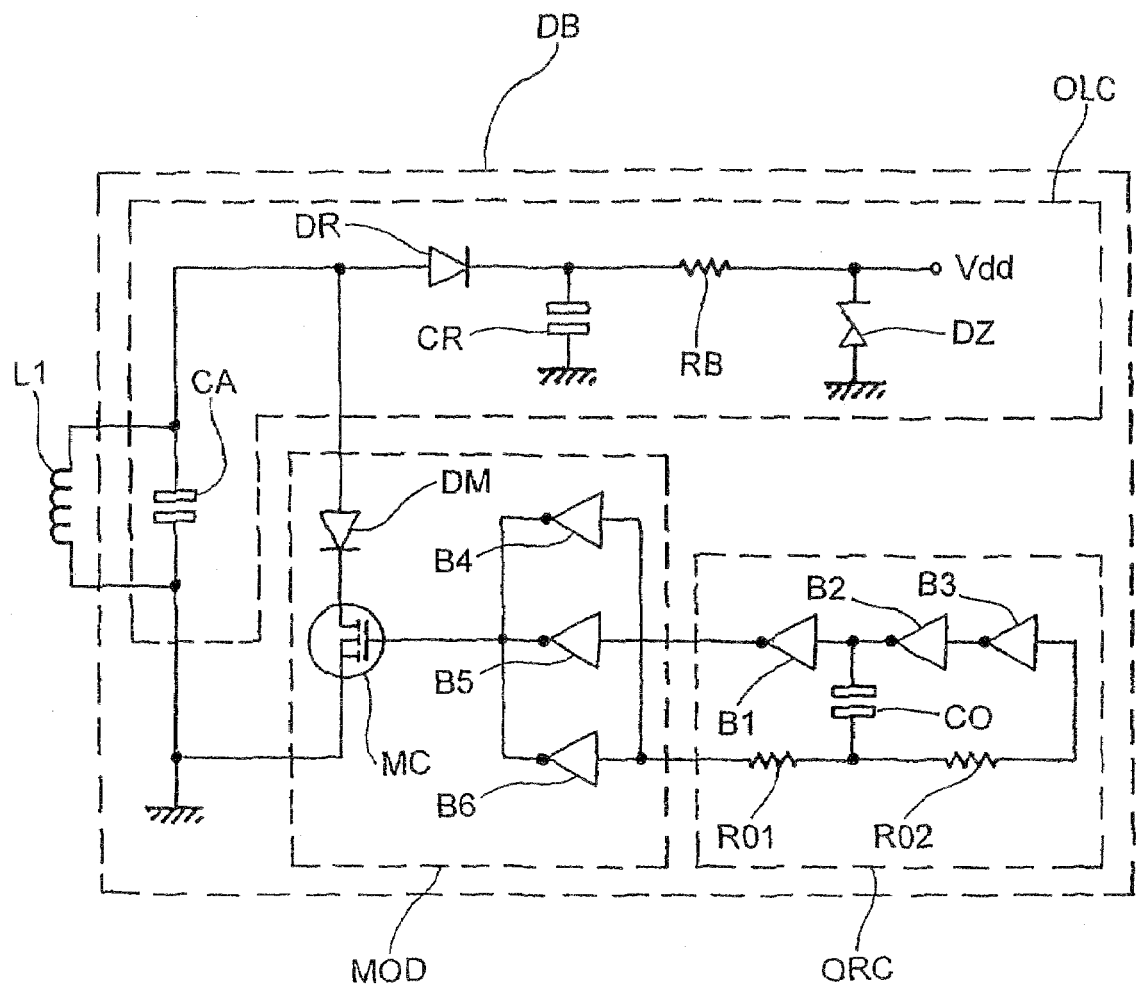
FIG. 1 is an equivalent circuit diagram of the jammer electronic device according to the invention implemented in the CMOS technology.

FIG. 1 shows the complete circuit of the active jammer device according to the invention including an external antenna L1 and an integrated circuit DB.

The antenna L1 is a printed or screenprinted loop on a support having a plurality of turns and a chosen area, for example.

The jammer electronic device DB is integrated in the form of a chip, for example. The chip can be implemented in the CMOS, Si-bipolar or like technology.

Structurally, the jamming means of the jammer electronic device DB of the invention comprise three main modules.

The first module OLC is formed on the one hand by a tuning capacitor CA for the external antenna L1 and on the other hand by components for obtaining a DC supply voltage VDD in the presence of the magnetic field created by the inductive component of an external contact-free communication station (not shown).

The second module comprises an oscillator circuit ORC that applies an alternating signal to the input terminals of modulation means MOD if said supply voltage VDD generated in this way exceeds a chosen threshold.

The third module comprises said amplitude modulation means MOD adapted to modulate the amplitude of the alternating signal at the terminals of the oscillatory circuit OLC formed by the antenna L1 and the first module OLC.

In one embodiment, the loop antenna L1 is produced as a printed or screenprinted circuit, for example, it is similar to that of a contact-free card conforming to the ISO 14443 standard.

The oscillator circuit OLC further comprises a tuning capacitor CA tuned with the inductive component L1 to generate at the terminals of the circuit OLC an alternative supply voltage induced in the presence of the magnetic field created by the inductive component of the station (not shown). Rectifier means (diode DR) transform the induced alternating supply voltage into a DC supply voltage VDD.

To power the logic circuits to be described in detail hereinafter, the DC component of the supply voltage VDD is filtered by a capacitor CR and then regulated by a zener diode DZ and a ballast resistor RB.

When the jammer electronic device is in the vicinity of the inductive component L3 (FIG. 4) of the external contact-free communication station LEC (FIG. 4), all the logic portion described in more detail hereinafter is powered.

The set of inverters B1, B2, B3 connected by resistors RO0 and RO2 and the capacitor CO form an RC type oscillatory circuit ORC and supply a squarewave signal with a duty cycle of 50%.

The oscillation frequency of the oscillator circuit is determined by the product RC of the values of the capacitor CO and the resistor RO1. For example, the oscillation frequency is in the 300-900 kHz range. This value is not critical for effective jamming.

The signal emitted by the oscillator ORC is applied to a power splitter (buffer) formed by three inverters B4, B5, B6 connected in parallel to provide an (on/off) switching regime for the MOS transistor MC.

This kind of power supply B4, B5, B6 provides a sharper attack and (on/off) switching than the transistor MC.

The modulation means MOD comprise the transistor MC and a diode DM clocked at the timing rate of the alternating signal output in this way by the oscillator ORC.

When the transistor MC is conducting, the oscillatory circuit OLC is strongly damped by the very low (less than 20 ohms) series resistances of the conducting transistor MC and diode DM. The diode DM is useful here for preventing opening of the intrinsic diode of the transistor MC during the negative half-cycles of the alternating signal RF received by the oscillatory circuit.

Referring to FIG. 3, there is obtained a load modulation generated in response to the powering of the logic components of the jammer device according to the invention.

For example, the load modulation rate generated by the jammer electronic device DB (FIG. 3) is higher than the load modulation rate generated by the contact-free electronic device CSC (FIG. 2).

The load modulation rate generated by the jammer electronic device DB is of the order of at least 70%. Obviously, other rates can be suitable, for example that of the contact-free card standardized at 10%.

In practice, the load modulation generated by the jammer electronic device DB in response to the magnetic field radiated by the external contact-free communication station LEC is permanent. It can also be intermittent.

The high modulation rate is manifested here through a large variation in the alternating carrier current in the timing of the oscillator ORC.

For the external contact-free communication station, the receiver portion of the reader demodulates the corresponding signal.

The jammer device DB is therefore able, in response to the magnetic field radiated by the external communication station LEC, to generate a load modulation liable to cause a collision with the load modulation generated by a contact-free electronic device CSC if the latter is disposed relative to said jammer electronic device in a chosen relationship, said collision caused in this way rendering inoperative the exchange of information between the external contact-free communication station (LEC) and the contact-free electronic device CSC.

In the nonlimiting example of a high load modulation rate (for example 70%, FIG. 3), it is seen that the station will demodulate a signal of much greater amplitude than the signal (FIG. 2) normally received from a contact-free electronic device conforming to the ISO 14443 standard, placed under similar conditions (of distance and position) as the jammer electronic device of the invention.

Referring to FIG. 2, it is seen that a contact-free card conforming to the ISO 14443 standard has a modulation rate equal to a standardized value of 10% with the sub-carrier of the conductive component L3 of the external reading station, for example having a value of 847.5 kHz.

Note also that the average signal from the jammer electronic device is higher than that from a standardized contact-free card because its DC component consumption is lower than that necessary to power the logic of an ISO 14443 contact-free card.

The Applicant has produced a jammer electronic device the results whereof are satisfactory with the following numerical values:
- external station reading frequency 13.56 MHz;
- inductive component L1 of 1.7 µH (three turns covering all of the ISO area);
- tuning capacitor CA equivalent to two 27 pF capacitors in parallel;
- ballast resistor RB of 470 ohms;
- filter capacitor CR of 1.5 nF;
- oscillation frequency in the range 300-900 kHz;
- BSS98/INF MOS transistor;
- capacitor CO of 100 pF;
- resistor RO0 of 1 to 20 kohms;
- resistor RO0 of 1 to 20 kohms;
- zener diode DZ of 4.7 volts.

FIG. 4 shows a nonlimiting application of the jammer electronic device DB according to the invention for folding documents such as passports, driver's licenses and the like.

To provide the antiskimming function in accordance with the invention, a contact-free electronic device CSC conforming to the ISO 14443 standard is associated with a jammer device DB and there are created two situations of closeness of the two devices to an external communication station LEC.

For example, a contact-free electronic device CSC is incorporated into the cover 12 of a document 10. The contact-free electronic device CSC comprises an antenna L2 and a microcircuit IC containing the data to be made secure.

The jammer device DB according to the invention as described with reference to FIG. 1 is incorporated into the other portion 14 of the document 10. The document is placed or offered up in the reading area of an inductive component L3 of an external contact-free communication station LEC.

The document 10 folds along a fold line 16 connecting the two portions 12 and 14.

If the document is closed or partly open, the jamming action of the device DB renders communication impossible. On the other hand, if the document is completely open, the jammer device DB finds itself in conditions of reduced coupling and the load modulation generated by the jammer device is much weaker, or non-existent if the jammer device DB is not activated. In this situation, communication takes place in the normal way.

An antiskimming method conforming to the invention can also be executed by an ISO format contact-free electronic device placed in a document case or wallet containing contact-free cards. If the document case is in the field of a station, the load modulation generated by the jammer device conforming to the invention that does not comply with the anticollision protocol prevents activation of the cards. To communicate intentionally only the contact-free card containing the data must be presented to the station.

The antiskimming countermeasure process conforming to the invention therefore prevents communication with a station without the acceptance and the intentional action of the holder of a contact-free card. In fact, if the contact-free card containing the data is associated with the jammer device conforming to the invention, to present the station with relatively similar communication conditions, the station will receive responses that have levels that interfere strongly and communication is impossible. The load modulation generated in this way by the jammer device (when it is supplied with power inductively by the station) prevents the setting up of communication between the station and the contact-free card containing the data. If an intentional action of the holder moves the jammer device away from the station then significantly stronger coupling is created for the contact-free card protected in this way by the jammer device according to the invention. It follows that the disturbing action (jamming) will become insignificant and the call can proceed normally between the external contact-free communication station and the contact-free electronic device (for example a contact-free card).

Note that the absolute power of the communication station is of no importance here, the interference here depending only on the ratio of the signals received by the jammer electronic device conforming to the invention and the contact-free electronic device.

Moreover, the presence of a jammer device in the active area of a station has no harmful effect in the overall system, because the station has no communication with this kind of jammer device.

The invention claimed is:

1. A jammer electronic device adapted to be magnetically coupled with an inductive component (L3) of an external contact-free communication station (LEC), the jammer electronic device comprising:
    means for active jamming (DB) adapted, in response to a magnetic field radiated by the external communication station (LEC), to generate a load modulation liable to cause a collision with a load modulation generated by a contact-free electronic device (CSC) when the latter is disposed relative to said jammer electronic device in accordance with a chosen relationship, said collision caused in this way rendering inoperative an exchange of information between the external contact-free communication station (LEC) and the contact-free electronic device (CSC).

2. The device according to claim 1, wherein the relationship between the jammer electronic device (DB) and the contact-free electronic device (CSC) is chosen so that when the jammer electronic device (DB) is in an immediate vicinity of the contact-free electronic device (CSC), said jammer electronic device (DB) renders inoperative communication between the external contact-free communication station (LEC) and the contact-free electronic device (CSC), whereas if the jammer electronic device (DB) is far away from the contact-free electronic device (CSC) communication between the external communication station (LEC) and the contact-free electronic device is rendered operative.

3. According to claim 2, wherein the means for active jamming comprise:
    an LC type tuned oscillatory circuit (OLC) adapted to pick up by magnetic coupling an alternating voltage in a presence of the magnetic field created by the inductive component (L3) of the external contact-free communication station (LEC);
    means for rectifiying means (DR) for transforming the alternating voltage captured in this way into a DC supply voltage (VDD); and
    an oscillator circuit (ORC) adapted, if said DC power supply voltage (VDD) generated in this way exceeds a chosen threshold, to apply an alternating signal to terminals of means for amplitude modulation (MOD) adapted to modulate the amplitude of said alternating signals at terminals of the oscillatory circuit (OLC).

4. The device according to claim 1, wherein a load modulation rate generated by the jammer electronic device is higher than the load modulation rate generated by the contact-free electronic device (CSC).

5. The device according to claim 4, wherein the load modulation rate generated by the jammer electronic device (DB) is of an order of at least 70%.

6. The device according to claim 4, wherein the means for active jamming comprise:
an LC tuned oscillatory circuit (OLC) adapted to pick up by magnetic coupling an alternating voltage in the presence of the magnetic field created by the inductive component (L3) of the external contact-free communication station (LEC);
means for rectifying (DR) for transforming the alternating voltage captured in this way into a DC supply voltage (VDD); and
an oscillator circuit (ORC) adapted, if said DC power supply voltage (VDD) generated in this way exceeds a chosen threshold, to apply an alternating signal to terminals of means for amplitude modulation (MOD) adapted to modulate the amplitude of said alternating signals at terminals of the oscillatory circuit (OLC).

7. The device according to claim 1, wherein the load modulation generated by the jammer electronic device (DB) in response to the magnetic field radiated by the external contact-free communication station (LEC) is permanent.

8. The device according to claim 1, wherein the means for active jamming means comprises:
an LC type tuned oscillatory circuit (OLC) adapted to pick up by magnetic coupling an alternating voltage in the presence of the magnetic field created by the inductive component (L3) of the external contact-free communication station (LEC);
means for rectifying (DR) for transforming the alternating voltage captured in this way into a DC supply voltage (VDD); and
an oscillator circuit (ORC) adapted, if said DC power supply voltage (VDD) generated in this way exceeds a chosen threshold, to apply an alternating signal to terminals of means for amplitude modulation (MOD) adapted to modulate the amplitude of said alternating signals at terminals of the oscillatory circuit (OLC).

9. The device according to claim 8, wherein the oscillatory circuit (OLC) comprises an antenna (L1) forming a loop tuned with a tuning capacitor (CA) and coupled to the inductive component (L3) of the external contact-free communication station (LEC) to generate at the terminals of the antenna (L1) an induced alternating supply voltage in the presence of the magnetic field created by the inductive component (L3) of the station (LEC).

10. The device according to claim 8, wherein the oscillator circuit (ORC) is an RC oscillator circuit and delivers an alternating signal at a chosen oscillation frequency.

11. The device according to claim 10, wherein the means for modulation (MOD) comprise means for switching (MC) clocked at said oscillation frequency.

12. The device according to claim 11, wherein the means for switching (MC) comprise a CMOS transistor.

13. An electronic document, including comprising:
a support (10) having at least a first portion (12) and a second portion (14) adapted to move one relative to the other; and
a contact-free electronic device (CSC) mounted in the first portion (12) of the support (10) and including an electronic microcircuit (IC) and an antenna (L2) electrically connected to said electronic microcircuit (IC) and adapted to be coupled magnetically with an external contact-free communication station (LEC), in that wherein
the second portion (14) has a jammer electronic device (DB) comprising means for active jamming adapted, in response to a magnetic field radiated by the external communication station (LEC), to generate a load modulation liable to cause a collision with the load modulation generated by the contact-free electronic device (CSC) when the contact-free electronic device (CSC) is placed in a chosen relationship relative to said jammer electronic device, said collision caused in this way rendering inoperative an exchange of information between the external contactless communication station (LEC) and the contact-free electronic device (CSC).

14. The document according to claim 13, wherein the first and second parts portions can be moved along a chosen displacement line (16).

15. The document according to claim 14, wherein the document belongs to a group formed by security documents, identity documents, passports, or driver's licenses.

16. The document according to claim 14, wherein the document can be folded.

17. The document according to claim 16, wherein the document belongs to a group formed by security documents, identity documents, passports, or driver's licenses.

18. The document according to claim 13, wherein the document belongs to a group formed by security documents, identity documents, passports, or driver's licenses.

19. Method A method for providing active security to a contact-free electronic device (CSC), comprising:
utilizing a jammer electronic device (DB) adapted, in response to a magnetic field radiated by an external communication station (LEC), to generate a load modulation liable to cause a collision with the load modulation generated by the contact-free electronic device (CSC) when the contact-free electronic device (CSC) is disposed relative to said jammer electronic device in a chosen relationship, said collision caused in this way rendering inoperative an exchange of information between the external contact-free communication station (LEC) and the contact-free electronic device (CSC).

20. A method of making secure the exchange of information between a contact-free electronic device (CSC) and an external contact-free communication station (LEC), said contact-free electronic device (CSC) including an electronic microcircuit (IC) and an antenna (L2) electrically connected to said electronic microcircuit (IC) and adapted to be magnetically coupled with the external contact-free communication station (LEC), characterized in that provision is made for using a jammer electronic device (DB) comprising active jamming means adapted, in response to the magnetic field radiated by the external communication station (LEC), to generate a load modulation liable to cause a collision with the load modulation generated by the contact-free electronic device (CSC) when the latter is disposed in a chosen relationship relative to said jammer electronic device, said collision caused in this way rendering inoperative the exchange of information between the external contact-free communication station (LEC) and the contact-free electronic device (CSC).

* * * * *